United States Patent Office.

IMPROVEMENT IN BALING PRESS.

WENDELL R. KING, OF CHICAGO, ILLINOIS.

*Letters Patent No. 60,196, dated December 4, 1866; antedated August 28, 1866.*

SPECIFICATION.

TO ALL WHOM IT MAY CONCERN:

Be it known that I, WENDELL R. KING, of Chicago, in the county of Cook, and State of Illinois, have invented a new and useful Improvement in Baling Presses; and I do hereby declare and make known that the following is a full, clear, and exact description of the same, reference being had to the accompanying drawings, and the letters and figures marked thereon, which form part of this specification.

My said invention consists in the arrangement in one apparatus of two presses which are operated alternately by a single screw in such a manner that turning said screw in one direction to compress the bale in one copartment of the press retracts the follower and releases the bale in the other copartment thereof, so that said bale may be readily removed, as desired; thus, by the said simultaneous and alternating action, avoiding all loss of time in operating the press.

To enable those skilled in the art to understand how to construct and use my said invention, I will proceed to describe its construction and operation with particularity, making reference, in so doing, to the aforesaid drawings, in which—

Figure 1 represents a plan or top view of my invention.

Figure 2 is a side view of the same; and

Figure 3 is a longitudinal vertical central section thereof.

Similar letters of reference in the several figures denote the same parts of my invention.

A A represent the two copartments of the press, and are constructed in all respects alike, having lids opening upwards to remove the bales and to place in the presses the material to be baled, said lids being firmly secured when the press is being operated by means of clamps and pins, as indicated at $a$, or in any other suitable manner. One of the side walls of each press is made adjustable, being held firmly in place when the bale is being compressed and released so as to yield back, as indicated by the dotted lines in fig. 1 at P, by means of a cam or eccentric, operated as desired, by means of a lever, Q, which projects out at the end of the press, a suitable recess, R, being provided in the lid for that purpose, while the bale is being pressed, but which is moved around, as indicated by dotted lines in fig. 1, to relax the bale and facilitate its removal after being confined in the usual manner by means of cords or wires. The entire machine is constructed of strong timbers, and supported upon the legs or standards, B. C represents a screw, arranged between said copartments A, as shown, each end being provided with a suitable follower D, which moves against or away from the bales alternately. The said screw is supported by passing through the cross-timbers E, suitable collars, L, being arranged therein, through which said screw has a free longitudinal sliding motion in either direction, a revolving motion being prevented by projections upon said collars entering a longitudinal recess, $c$, in the screw C, as shown at $l$. Between the said cross-beams, E, there is arranged upon said screw C a nut, N, upon which are fixed one or more gear-wheels, F G, as shown. H represents a shaft, supported in bearings or boxes in the standards K, erected for that purpose upon the apparatus, and is provided with two gear-wheels which are marked J I, and engage respectively with the spur-wheels aforesaid upon the nut N, being so arranged, however, upon the shaft H that only one of said wheels engages with its corresponding spur upon the nut at the same time; and as the shaft H is adjustable longitudinally either of said wheels I or J may be in gear with the nut as may be desired, the shaft H being locked in either position by means of a latch, M, and the recesses, $b\ d$, in the shaft, as shown. The ends of the said shaft H are so constructed that cranks may be attached thereto for the purpose of operating the press. The two sets of gearing, F J, and G I, are to provide for a faster movement of the followers when the pressure is first being applied, and a slower and more powerful compression as the pressing is being completed. The length of the screw C is such that when it is turned into one of the said copartments of the press it is withdrawn from the other sufficiently to permit the loose material to be deposited therein, so that when the lever Q is thrown into the position indicated by the full lines in fig. 1, and the lid is thrown down and secured, and the screw turned in the proper direction, it, the material placed therein, will be gradually compressed as desired, while the same movement of the screw withdraws from the opposite copartment and releases the pressure from the bale therein, while by bringing the lever Q around, as indicated in the dotted lines in fig. 1, the lid having been previously opened, the lateral and vertical pressure being then also removed, the bale is readily removed, and by the time the opposite bale has been properly compressed it is ready to receive the material for the next bale; and thus, as will be seen, no time is lost, the retractions of the screw from one bale being the

E. H. Knight
Comb
N° 60,197. Patented Dec. 4, 1866.
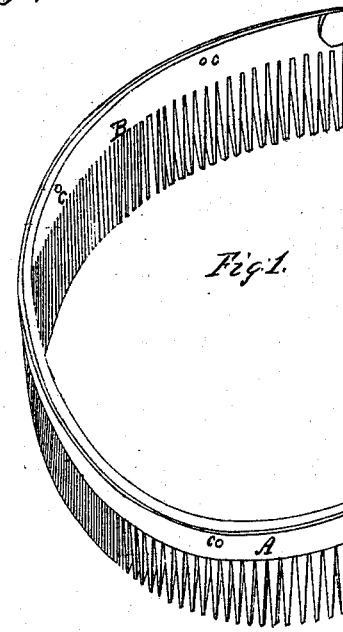
Fig. 1.
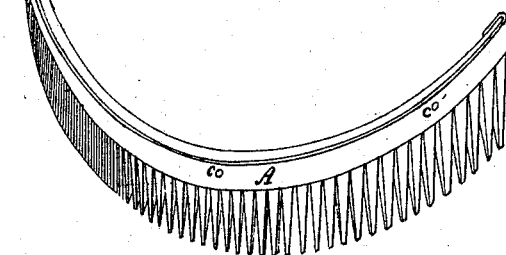
Fig. 2. Fig. 3. Fig. 4. Fig. 5.
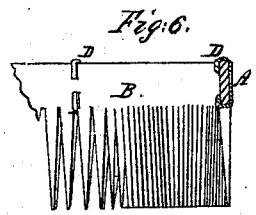
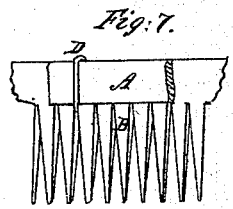
Fig. 6. Fig. 7.
Witnesses
W. T. Call
C. A. Pettit
Inventor
Edward H. Knight